US009760796B2

United States Patent
Manabe et al.

(10) Patent No.: US 9,760,796 B2
(45) Date of Patent: Sep. 12, 2017

(54) ROOM INFORMATION INFERRING APPARATUS INCLUDING A PERSON DETECTOR AND A PRESENCE MAP GENERATOR, ROOM INFORMATION INFERRING METHOD INCLUDING PERSON DETECTION AND PRESENCE MAP GENERATION, AND AIR CONDITIONING APPARATUS

(71) Applicant: OMRON Corporation, Kyoto-shi, Kyoto (JP)

(72) Inventors: Seiichi Manabe, Shiga (JP); Jun Nakaichi, Shiga (JP)

(73) Assignee: OMRON Corporation, Kyoto (JP)

(*) Notice: Subject to any disclaimer, the term of this patent is extended or adjusted under 35 U.S.C. 154(b) by 124 days.

(21) Appl. No.: 14/751,732

(22) Filed: Jun. 26, 2015

(65) Prior Publication Data
US 2016/0012309 A1 Jan. 14, 2016

(30) Foreign Application Priority Data
Jul. 11, 2014 (JP) .................. 2014-143645

(51) Int. Cl.
G06K 9/00 (2006.01)
G06K 9/52 (2006.01)
(Continued)

(52) U.S. Cl.
CPC .............. *G06K 9/52* (2013.01); *F24F 11/006* (2013.01); *F24F 11/0034* (2013.01);
(Continued)

(58) Field of Classification Search
None
See application file for complete search history.

(56) References Cited

U.S. PATENT DOCUMENTS 7,852,217 B2 * 12/2010 Kondo ................... G01S 13/04
340/572.1
2009/0210193 A1 * 8/2009 Nagase ............... F24F 11/0034
702/152
(Continued)

FOREIGN PATENT DOCUMENTS

EP 2163832 A2 3/2010
JP 2000-346432 A 12/2000
(Continued)

OTHER PUBLICATIONS

Office Action in counterpart Korean Patent Application No. 10-2015-0068700 issued on Jul. 27, 2016 (14 pages).
(Continued)

*Primary Examiner* — Tahmina Ansari
(74) *Attorney, Agent, or Firm* — Osha Liang LLP

(57) ABSTRACT

A room information inferring apparatus that infers information regarding a room has an imaging unit that captures an image of a room that is to be subjected to inferring, a person detector that detects a person in an image captured by the imaging unit, and acquires a position of the person in the room, a presence map generator that generates a presence map indicating a distribution of detection points corresponding to persons detected in a plurality of images captured at different times, and an inferring unit that infers information regarding the room based on the presence map.

20 Claims, 14 Drawing Sheets

(51) Int. Cl.
*G06T 7/20* (2017.01)
*G06T 7/60* (2017.01)
*G06K 9/46* (2006.01)
*G06T 11/20* (2006.01)
*F24F 11/00* (2006.01)
*G05B 13/02* (2006.01)

(52) U.S. Cl.
CPC ...... *F24F 11/0078* (2013.01); *G05B 13/0205* (2013.01); *G06K 9/00268* (2013.01); *G06K 9/00362* (2013.01); *G06K 9/00476* (2013.01); *G06K 9/4604* (2013.01); *G06T 7/20* (2013.01); *G06T 7/60* (2013.01); *G06T 11/20* (2013.01); *F24F 2011/0035* (2013.01); *F24F 2011/0036* (2013.01); *G06K 2009/4666* (2013.01); *G06T 2207/30201* (2013.01)

(56) References Cited

U.S. PATENT DOCUMENTS

| | | | | |
|---|---|---|---|---|
| 2010/0063636 | A1* | 3/2010 | Matsumoto | F24F 11/0034 700/276 |
| 2012/0020518 | A1* | 1/2012 | Taguchi | G06T 7/2093 382/103 |
| 2012/0324928 | A1* | 12/2012 | Durham | G05B 13/0205 62/129 |
| 2013/0170760 | A1* | 7/2013 | Wang | G06K 9/00771 382/224 |
| 2016/0012309 | A1* | 1/2016 | Manabe | G06K 9/52 700/276 |
| 2016/0110602 | A1* | 4/2016 | Chujo | G06K 9/00778 382/103 |

FOREIGN PATENT DOCUMENTS

| | | |
|---|---|---|
| JP | 2008-261567 A | 10/2008 |
| JP | 2010-190432 A | 9/2010 |
| JP | 2012-017936 A | 1/2012 |
| JP | 2013024534 A | 2/2013 |
| WO | 2008/152862 A1 | 12/2008 |

OTHER PUBLICATIONS

Extended European Search Report issued in corresponding European Application No. 15171863.2, mailed on Nov. 19, 2015 (7 pages).

* cited by examiner

ROOM INFORMATION INFERRING APPARATUS INCLUDING A PERSON DETECTOR AND A PRESENCE MAP GENERATOR, ROOM INFORMATION INFERRING METHOD INCLUDING PERSON DETECTION AND PRESENCE MAP GENERATION, AND AIR CONDITIONING APPARATUS

BACKGROUND

Field

The present invention relates to a technique for inferring information regarding a room.

Related Art

With household appliances used indoors, there are cases where it may be preferable to perform control in accordance with the shape or the like of the room in which the household appliance is installed. For example, if an air conditioning apparatus does not perform air conditioning control in accordance with the shape of the room, it is possible for air to not circulate, and for hot spots to form.

In recent years, there have been air conditioners that allow a user to input the shape of the room, and perform air conditioning control in accordance with the room shape that was input (see JP 2000-346432A, for example). However, it is troublesome for the user if it is necessary during apparatus installation to input information such as whether the shape of the room is elongated lengthwise, elongated widthwise, square, or the like, whether the air conditioner is installed at a central, rightward, or leftward position, and whether the distance to the opposing wall is long, normal, or short. Also, since air conditioners have poor user interfaces, only a rough room shape can be input. Accordingly, there are situations in which the distance to the opposing wall is not known even if the rough room shape is known. Furthermore, if the shape of the actual room is a more complex shape, or if furniture is placed in the room, it may be preferable to perform air conditioning control that takes these facts into consideration, but it is difficult to realize optimal air conditioning control with merely the input of a rough room shape.

Also, there is known to be technology in which a TOF ranging sensor or stereo camera ranging sensor is used to acquire the shape of a room (see JP 2008-261567A, for example). The use of a ranging sensor makes it possible to accurately obtain the shape of the room, thus making it possible to perform optimal air conditioning control in accordance with the room shape. However, a TOF ranging sensor is expensive. Also, a stereo camera ranging sensor requires two cameras, and thus has a higher cost than a monocular camera.

There is also known to be technology in which air conditioning control is performed based on the presence of people in a room, the distribution of such people, and the like (see JP 2012-17936A, for example). JP 2012-17936A discloses that peoples' heads are recognized, information such as the number of people and distribution thereof over time in the room is acquired, and air conditioner air conditioning control and the like are performed based on such information. However, in the technique disclosed in JP 2012-17936A, the shape of the room cannot be acquired, and therefore it is not possible to perform air conditioning control in accordance with the shape of the room.

Although the above description mainly takes the example of an air conditional apparatus, and describes that the shape of the room in which the apparatus is installed is used in control, the information useful in air conditioning control is not limited to the shape of the room. Other room-related information is also useful in air conditioning control, such as the arrangement of furniture in the room, and regions where people are present in the room. Also, the apparatus to which room information is useful is not limited to an air conditioning apparatus, and in the case of a lighting control apparatus for example, more appropriate lighting control can be realized by taking the shape of the room and the like into consideration.

JP 2000-346432A, JP 2008-261567A, and JP 2012-17936A are examples of background art.

SUMMARY

One or more embodiments of the present invention provides a technique in which information regarding a room can be inferred easily and precisely.

One or more embodiments of the present invention employs a configuration in which an image of a room is captured by an imaging unit, a person is detected in the captured image, and information regarding the room is inferred based on a history of person detection positions.

Specifically, a room information inferring apparatus according to one or more embodiments of the present invention is a room information inferring apparatus that infers information regarding a room, the room information inferring apparatus including: an imaging unit that captures an image of a room that is to be subjected to inferring; a person detection unit that detects a person in an image captured by the imaging unit, and acquires a position of the person in the room; a presence map generation unit that generates a presence map indicating a distribution of detection points corresponding to persons detected in a plurality of images captured at different times; and an inferring unit that infers information regarding the room based on the presence map.

Examples of room-related information include the shape of the room, furniture placement regions in the room, and people containing regions. According to this configuration, even if the user does not input information, it is possible to accumulate detected positions of persons detected in captured images, and infer information regarding the room based on the distribution of detection points. In particular, the more person detection results that are accumulated, the more accurately information regarding the room can be inferred.

Person detection can be performed using various techniques. For example, the person detection unit may detect a face, a head, or an upper body of the person in the image, and acquire the position of the person in the room based on a position and a size of the face, the head, or the upper body in the image. Based on the position and size of the face, head, or upper body in the image, it is possible to determine not only a horizontal position in the room, but also a height position. Since a face, head, or upper body is detected in the captured image in this technique, a normal monocular camera can be employed as the imaging unit, and it is possible to suppress the manufacturing cost. Also, by tracking the detected face or head, it is also possible to perform person tracking processing, and it is possible to acquire movement paths and determine whether a person is moving or stationary. The use of such information makes it possible to also acquire more detailed information about the room.

In one or more embodiments of the present invention, the inferring unit may infer a shape of the room based on the presence map, as information regarding the room. Processing for inferring the shape of the room based on the presence map can be performed as follows, for example. Specifically, the inferring unit may infer that a polygon circumscribed around the distribution of detection points in the presence map is the shape of the room. Here, the polygon may be any polygon, but it is thought that a rectangle will be employed, for example. Here, the inferring unit may infer the shape of the room based on an assumption that the room is defined by straight lines that are parallel in two mutually orthogonal directions. This is because the walls of a room generally extend in mutually orthogonal directions. Also, according to one or more embodiments of the present invention, the two directions are respectively an imaging direction of the imaging unit and a direction orthogonal to the imaging direction. This is because if the imaging unit is installed on a wall surface, and the direction orthogonal to that wall surface is considered to be the imaging direction, these two directions are the directions in which the walls extend.

Also, one or more embodiments of the present invention, when inferring the shape of the room, the inferring unit deems that a wall surface is outward by a predetermined distance from a shape obtained as a polygon circumscribed around the distribution of detection points in the presence map. This is because users are generally not located directly next to wall surfaces, but rather move between positions separated from wall surfaces by a predetermined distance. Note that in the case of moving, a user does not move along a wall surface, but it is possible for the user to be stationary in a posture of leaning against a wall. In view of this, one or more embodiments of the present invention, the person detection unit also detects whether a person at a detected position is moving or stationary, and in a case of a detection point at which the person is stationary, the inferring unit sets the predetermined distance lower than in a case of a detection point at which the person is moving.

Also, in one or more embodiments of the present invention, the inferring unit infers a placement region or the like of a furniture item or the like as information regarding the room. For example, in a case where the presence map includes a blank region that includes no detection points and is surrounded by detection points, the inferring unit may infer that the blank region is a region in which a furniture item is placed. This is because users cannot enter a region where a furniture item is placed, and therefore person detection is not performed in a furniture placement region.

Furthermore, the person detection unit may also detect whether a person at a detected position is moving or stationary, and in a case where a group of stationary points exists in a periphery of the blank region, the inferring unit may infer that a table and chairs are placed in the blank region. This is because a furniture item that users are often stationary around is typically a table or a chair. Note that in the case where a user sits in a chair, the head is detected at a low height. Accordingly, in one or more embodiments of the present invention, the condition that there are many detection points with low head detection heights is further added as a condition for inferring that a table is placed in a blank region.

Also, in a case where the presence map includes a blank region that includes no detection points and is not surrounded by detection points, the inferring unit may infer that the blank region is a wall region or a region in which a furniture item is placed next to a wall. In one or more embodiments of the present invention, a separate sensor is used to determine whether the blank region is a wall region or a region in which a furniture item is placed.

Also, the inferring unit may infer a people containing region based on the presence map, as information regarding the room. For example, the inferring unit can infer that, in the presence map, a region in which the number of detection points is higher than a predetermined percentage is a people containing region. Also, the person detection unit may also detect whether a person at a detected position is moving or stationary, and the inferring unit may infer that, in the people containing region, a region including more than a predetermined percentage of stationary detection points is a stationary region. Alternatively, the inferring unit may infer that, in the people containing region, a region including more than a predetermined percentage of moving detection points is a movement region.

Also, it is possible to distinguish between a doorway in a room, a storage space, and the like based on the result of person tracking processing performed using person detection. For example, in one or more embodiments of the present invention, the person detection unit also performs processing for tracking a detected person, and in a case of a location at which the number of intersections between person movement paths and a boundary of the inferred room shape is greater than or equal to a predetermined number, the inferring unit infers that the location is a doorway of the room or a storage space. This is because a location on the boundary of the room shape where there are many intersections with movement paths is often a room doorway or a storage space such as a cabinet or a closet. Here, in a case of a location at which the number of intersections between person movement paths and the boundary of the inferred room shape is greater than or equal to a predetermined number, and at which person tracking can no longer be performed, or a person is newly detected, the inferring unit may infer that the location is a doorway of the room. Also, in a case of a location at which the number of intersections between person movement paths and a boundary of the inferred room shape is greater than or equal to a predetermined number, and at which person tracking can be continued, the inferring unit may infer that the location is a storage space. When a person exits a doorway, it is no longer possible to track that person, and when a person enters through a doorway, person tracking starts at that time, and therefore the position of the doorway serves as the end point or start point of person tracking. On the other hand, in the case of a storage space, person tracking can be continued. Due to this difference, it is possible to distinguish between a doorway and a storage space.

Also, if person detection results and time information are used together, it is possible to infer a life scene. Specifically, the person detection unit may also acquire time information indicating when the person was detected, the room information inferring apparatus may further include a storage unit that stores a life scene definition that includes a time period and a behavior pattern, and the inferring unit may infer a life scene that appears in the room based on a behavior pattern of a person obtained based on a detection result from the person detection unit, time information indicating when the person was detected, and the life scene definition stored in the storage unit. For example, information indicating that if a predetermined behavior pattern appears in a predetermined time period, a specific life scene is appearing is stored in the life scene definitions. Then if a defined behavior pattern appears in a time period defined in the life scene definitions, it can be determined that the corresponding life scene is appearing in the room. In this case, it is also possible to specify the time period in which and the location at which the life scene is actually appearing, for example. For example, it is possible to define a life scene in which, if a person is standing for a long duration at a location in a certain region in the evening time period, the person is cooking at that location. If it is inferred by the life scene inferring unit that the "cooking" life scene is appearing, it is possible to determine the time period in which cooking is actually taking place, the location of the kitchen, and the like.

Note that the present invention also encompasses a room information inferring apparatus that includes at least a portion of the above units. Also, the present invention encompasses a room information inferring method, a computer program for causing a computer to execute the steps of this method, and a non-transitory computer-readable storage medium storing this program. The present invention can be configured by any combination of the above configurations and processes as long as no technical conflict arises.

Also, the present invention encompasses an apparatus that performs control based on room information inferred using the room information inferring apparatus or room information inferring method. For example, one or more embodiments of the present invention is an air conditioning apparatus that includes the above-described room information inferring apparatus and a control unit that performs air conditioning control based on room information inferred by the room information inferring apparatus. One or more embodiments of the present invention is a lighting control apparatus that includes the above-described room information inferring apparatus and a control unit that performs lighting control based on room information inferred by the room information inferring apparatus.

According to one or more embodiments of the present invention, it is possible to infer information regarding a room simply and precisely, without input from a user.

DETAILED DESCRIPTION

Embodiments of the invention will be described below in detail in an illustrative manner with reference to the drawings. Note that unless otherwise stated in particular, the dimensions, materials, shapes, relative arrangements, and the like of constituent parts described in the following embodiments are not intended to limit the scope of this invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Configuration of Air Conditioning Apparatus

Figure 1:
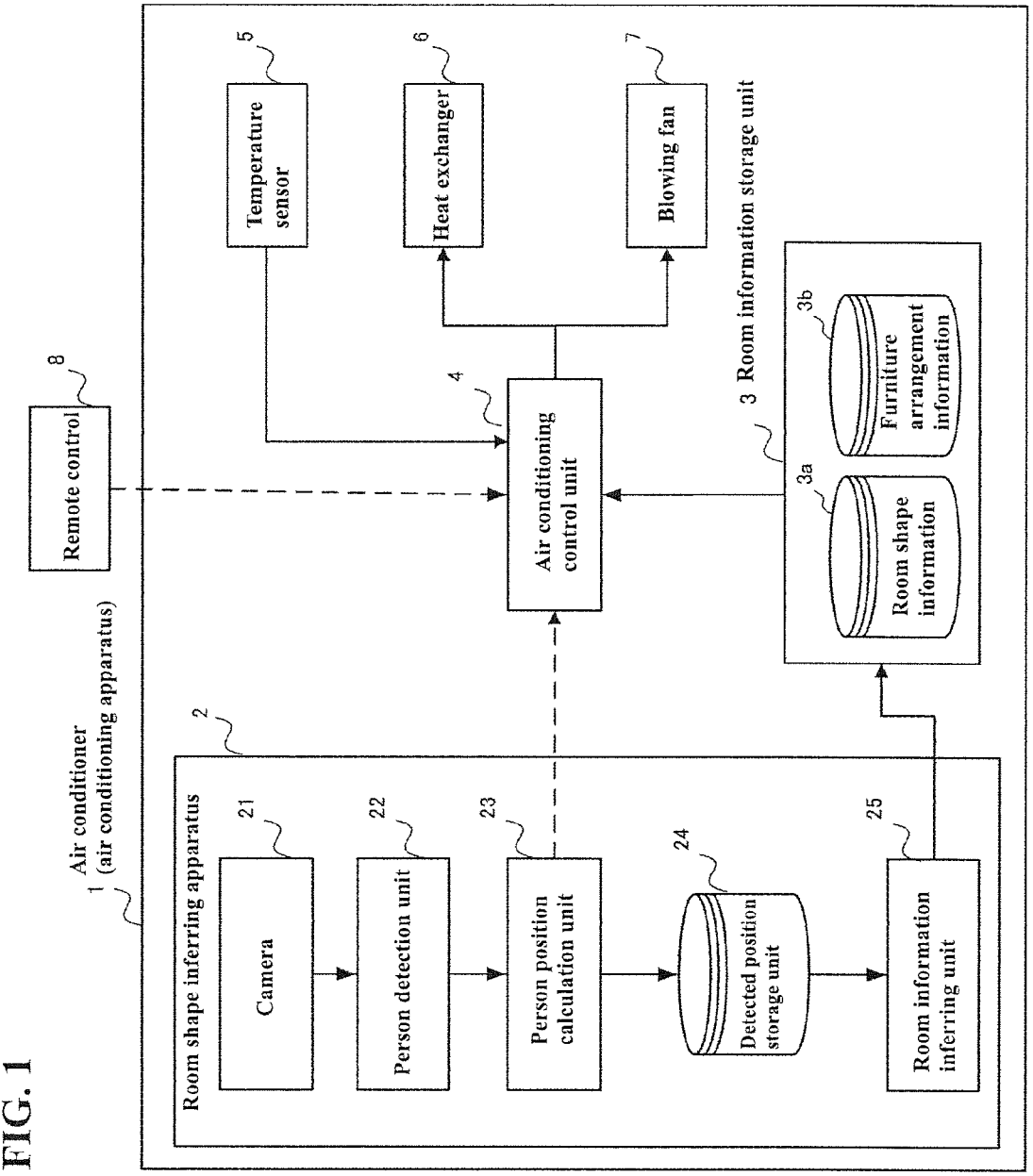
FIG. 1 is a diagram showing functional blocks of an air conditioner apparatus that includes a room information inferring apparatus according to a first embodiment.
Figure 2A:
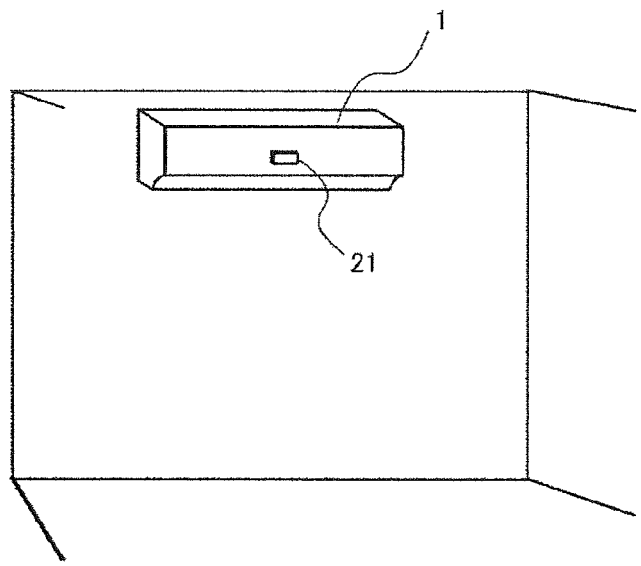
FIGS. 2A and 2B are external views of the air conditioner apparatus.
Figure 2B:
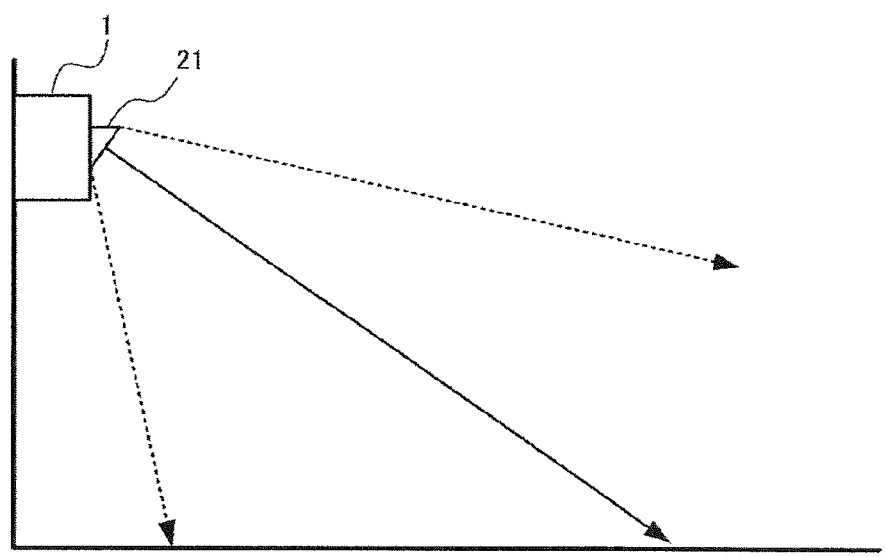

The following describes the overall configuration of an air conditioning apparatus (referred to below as "air conditioner apparatus") according to a first embodiment of the present invention with reference to FIGS. 1 and 2A and 2B. FIG. 1 is a diagram showing functional blocks of the air conditioner apparatus, and FIGS. 2A and 2B are external views of the air conditioner apparatus. An air conditioner apparatus 1 includes a room information inferring apparatus 2 in which a person detection function is used, and carries out air conditioning control based on room-related information inferred by the room information inferring apparatus 2. Note that in the first embodiment, a room shape and a furniture placement region are inferred as room information, and air conditioning control is carried out based on these pieces of room information.

The air conditioner apparatus 1 is mainly constituted by the room information inferring apparatus 2, a room information storage unit 3, an air conditioning control unit 4, a temperature sensor 5, a heat exchanger 6, and a blowing fan 7. The room information storage unit 3 stores room shape information 3a and furniture arrangement information 3b. The room information inferring apparatus 2 has a camera 21, a person detection unit 22, a person position calculation unit 23, a detected position storage unit 24, and a room information inferring unit 25.

The air conditioning control unit 4 is constituted by a processor, a memory, and the like, and, by the processor executing programs, the air conditioning control unit 4 determines operating conditions including a desired temperature, blowing direction, and blowing amount, and controls the heat exchanger 6, the blowing fan 7, and the like so as to operate under the determined operating conditions. When determining the operating conditions, the air conditioning control unit 4 gives consideration to set conditions (e.g., set temperature) input from a remote control 8 and a room temperature obtained from the temperature sensor 5, and additionally gives consideration to room-related information obtained from the room information inferring apparatus 2 (the room shape information 3a and the furniture arrangement information 3b). Also, since the room information inferring apparatus 2 has the person detection function, the air conditioning control unit 4 also gives consideration to real-time person detection results when determining the operating conditions.

The temperature sensor 5 acquires the temperature in a room using an infrared sensor, for example. The heat exchanger 6 is connected to an outdoor unit (not shown) to configure a refrigerating cycle, and heats and cools air taken into the heat exchanger 6. The blowing fan 7 is an apparatus that generates an air current, and circulates the air in a room. The blowing amount and blowing direction (up and down directions, and left and right directions) of the blowing fan 7 can be adjusted.

The room information inferring apparatus 2 is an apparatus that captures an overall image of a room, detects people in the captured image, and infers room-related information based on the distribution of detected positions of persons. The room information inferring apparatus 2 of the first embodiment infers a room shape and furniture placement regions. The room information inferring apparatus 2 is configured as a computer that includes a processor, a memory, and the like, and realizes functions of the person detection unit 22, the person position calculation unit 23, the detected position storage unit 24, the room information inferring unit 25, and the like by the processor executing programs. Note that some or all of these functional units may be constituted by an ASIC or FPGA circuit.

The camera 21 is attached to the front face of the air conditioner apparatus 1 as shown in FIG. 2A, and is constituted so as to be able to capture an overall image of a room. As shown in FIG. 2B, the imaging direction of the camera 21 is a direction facing downward by a predetermined angle from the direction perpendicular to the wall surface on which the air conditioner apparatus 1 is installed. The camera 21 periodically performs imaging, and person detection processing is carried out by the person detection unit 22 based on captured images. Although any imaging interval may be used, it is desirable that the interval is short to a certain degree so as to be able to track people. The imaging interval is an interval of 1 second, for example.

The person detection unit 22 is a functional unit that detects a person in an image captured by the camera 21. The person detection unit 22 can detect a person by detecting a face in a captured image or parts of a face (e.g., eyes, nose, mouth). Alternatively, the person detection unit 22 may detect a person by detecting a head or an upper body in a captured image. The person detection unit 22 detects the position of a person in a captured image, as well as the size of the face, head, or upper body. The person detection unit 22 may further detect the direction of the face, body, or line of sight of a detected person, for example.

The person position calculation unit 23 is a functional unit that acquires the position of a person in a room based on the position and the size of a face, a head, or an upper body in a captured image, which are detected by the person detection unit 22. The person position calculation unit 23 calculates the three-dimensional position (a plane position and a height) of the detected person based on the position and the size of the face, the head, or the upper body in the captured image, and the angle of view, the installation angle, and the installation height of the camera 21. The positions of persons calculated by the person position calculation unit 23 are stored and accumulated in the detected position storage unit 24. Note that time information indicating when the person was detected is also stored as additional information in association with the positions. Other additional information is stored in association with detected positions, such as time information indicating when imaging was performed, information indicating whether the detected person is standing or sitting, the movement path of the detected person, and information indicating whether the person was moving or stationary when detected. Whether the detected person is standing or sitting can be obtained based on the height of the detected position. Note that a lying position may be deemed to be a sitting position, or these positions may be distinguished from each other, and it may be determined whether the detected person is standing, sitting, or lying down. The movement path can be acquired by person tracking processing. Also, whether the detected person is moving or stationary can be detected based on the movement path. Hereinafter, a detection point that is detected in a moving state is referred to as a moving point, and a detection point that is detected in a stationary state is referred to as a stationary point.

The detected position storage unit 24 stores the positions (actual positions) of persons in the room, which are calculated by the person position calculation unit 23. Here, as previously described, the detection time, the corresponding movement path, and information indicating a moving point or a stationary point are also stored in association. By continuously performing person detection processing for a certain duration, information regarding multiple detection points detected at different times is accumulated in the detected position storage unit 24.

The room information inferring unit 25 infers room information based on the person detection results accumulated in the detected position storage unit 24. The room information inferring unit 25 infers the room shape (the shape of wall surfaces), the furniture arrangement (furniture placement regions), the doorway placement positions, and the like based on the distribution of person detection points. In the first embodiment, these pieces of information are collectively referred to as room information. The room information inferred by the room information inferring unit 25 is stored in the room information storage unit 3 and referenced when the air conditioning control unit 4 performs air conditioning control. A more detailed description of the content of processing performed by the room information inferring unit 25 will be described below with reference to flowcharts.

Processing Flow

Figure 3:
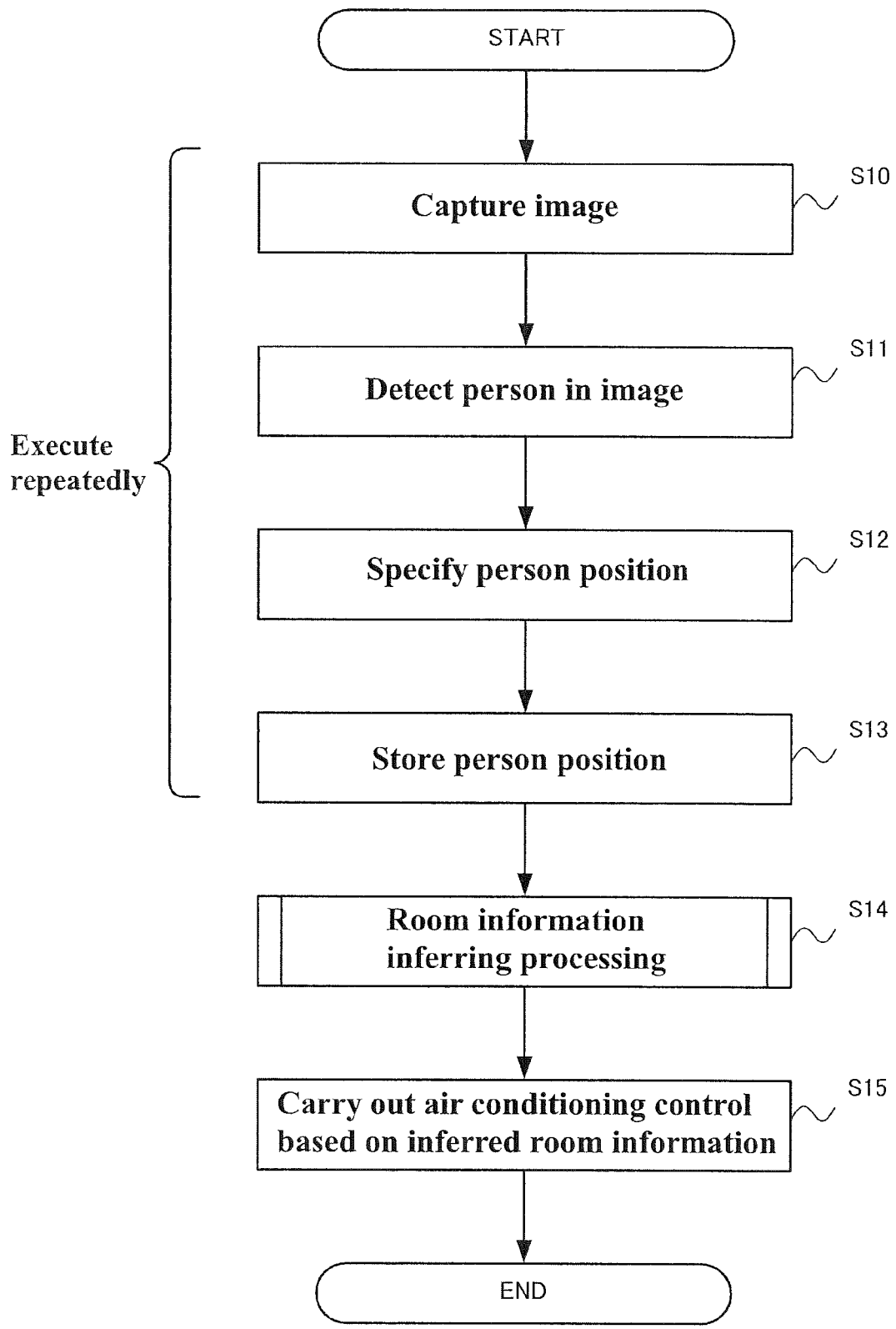
FIG. 3 is a flowchart showing a flow of air conditioning control processing performed by the air conditioner apparatus.
Figure 6:
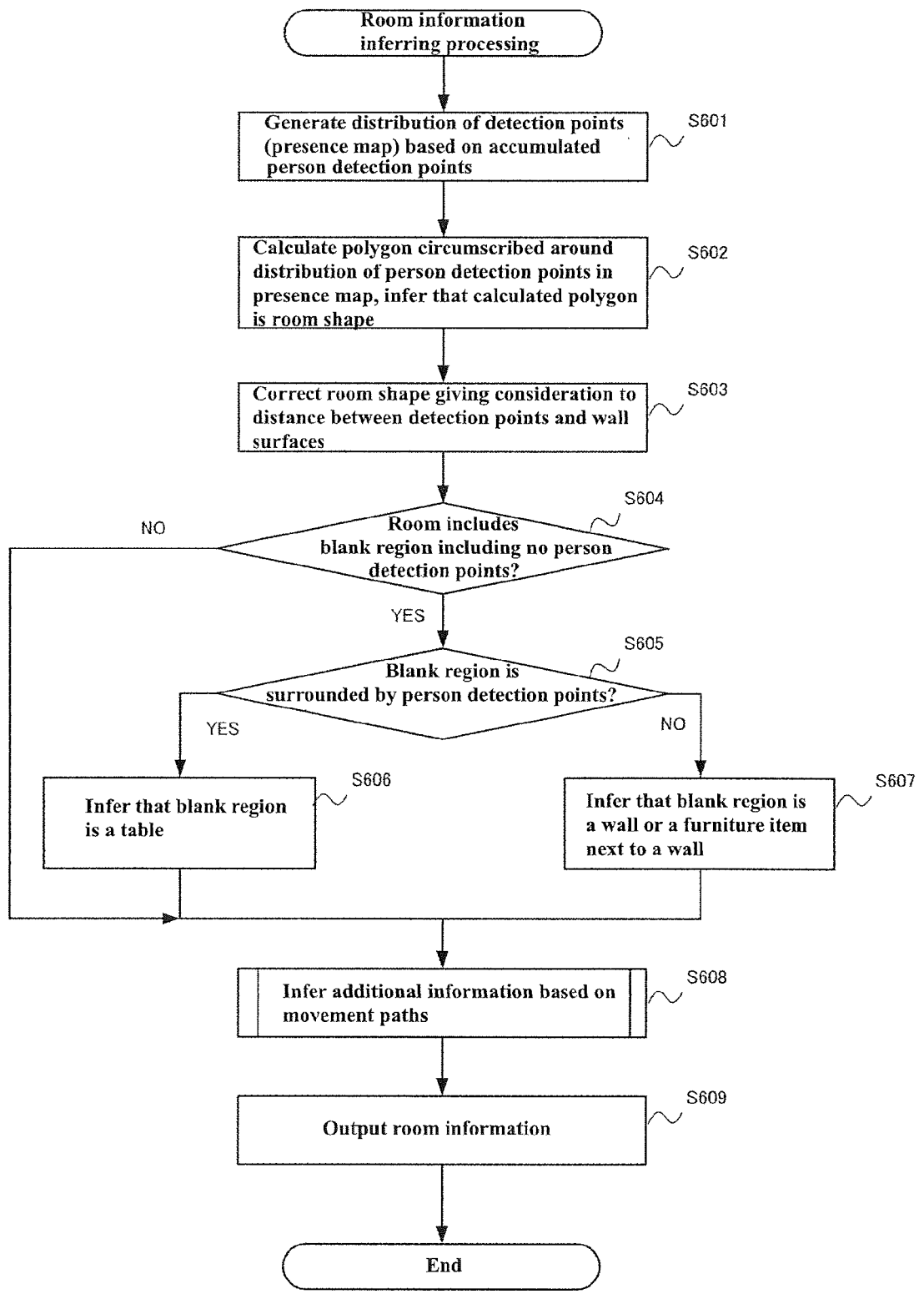
FIG. 6 is a flowchart showing a flow of room information inferring processing performed by the room information inferring apparatus.

Next, the flow of air conditioning control processing performed by the air conditioner apparatus 1 will be described with reference to the flowcharts of FIGS. 3 and 6. FIG. 3 is a flowchart showing the overall flow of air conditioning control processing, and FIG. 6 is a flowchart showing the flow of room information inferring processing.

Figure 4A:
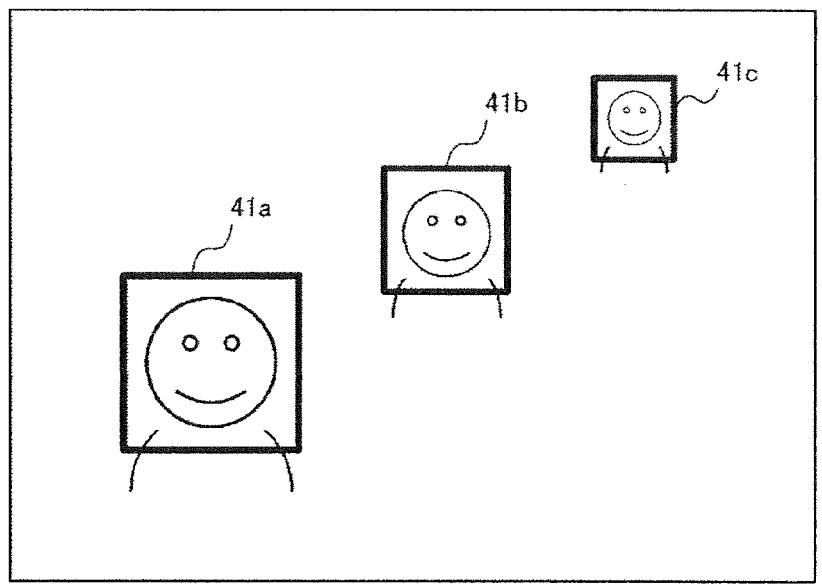
FIGS. 4A and 4B are diagrams for describing a relationship between face detection results and person positions.

First, the camera 21 captures an image of the room in which the air conditioner apparatus 1 is installed (the room to be subjected to room information inferring) (step S10), and the person detection unit 22 performs person detection on the captured image (step S11). FIG. 4A shows an example of a person detection result. In FIG. 4A, three persons 41a, 41b, and 41c have been detected. The person detection unit 22 acquires the positions of the detected persons in the image, and the sizes of the persons (the sizes of faces, since faces have been detected in this case).

Figure 4B:
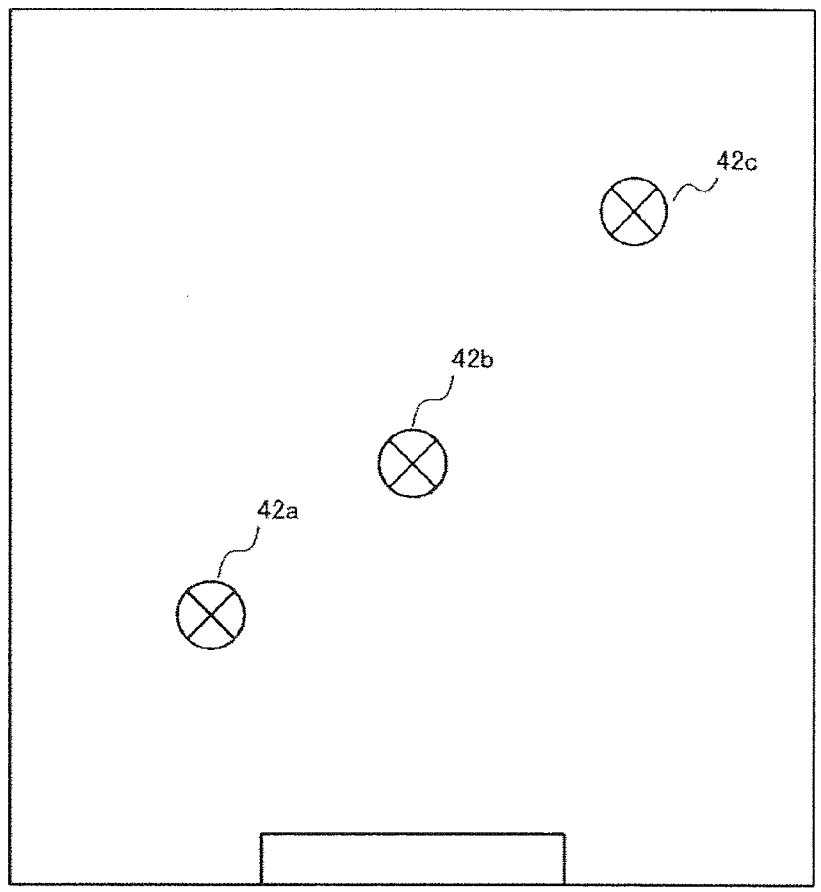
Figure 5A:
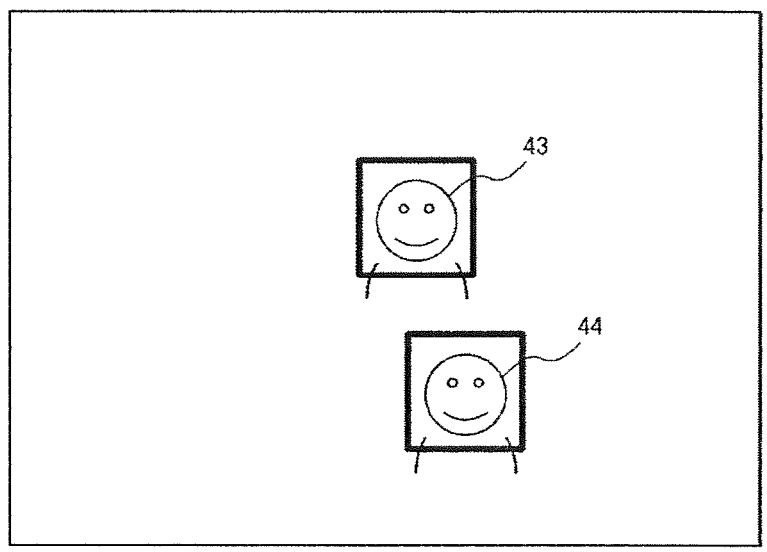
FIGS. 5A to 5C are diagrams for describing a relationship between face detection results and person positions.
Figure 5B:
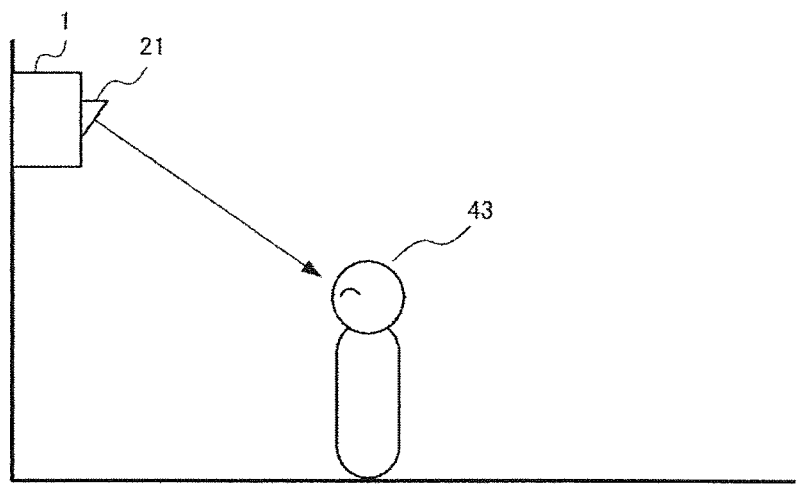
Figure 5C:
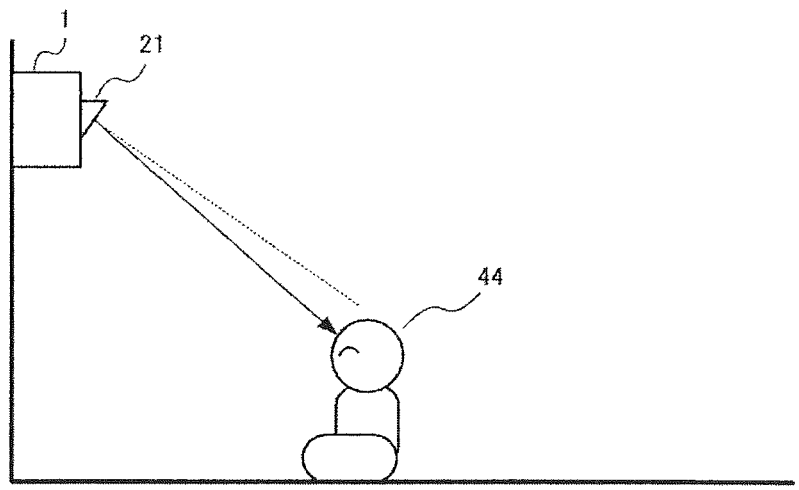

The person position calculation unit 23 specifies the positions of the detected persons in the room based on the positions of the detected persons in the image and the sizes of the detected persons, as well as the angle of view, the installation height, and the like of the camera 21 (step S12). FIG. 4B shows plane positions 42a, 42b, and 42c in the room, which correspond to the detected persons 41a, 41b, and 41c in FIG. 4A. Since the directions in which the persons are present are known based on the positions of the persons in the captured image, and their distances from the camera 21 are known based on the sizes of the persons (the faces in this case), it is possible to calculate three-dimensional positions of the persons. FIGS. 5A to 5C show examples of the case of detecting persons that are at approximately the same horizontal position and have different heights. FIG. 5A shows an image captured by the camera 21 in this situation. In FIG. 5A, two persons 43 and 44 have been detected. It is understood that the person 44 is at a low position based on the fact that the size of their face is relatively large regardless of being located at a lower position in the captured image. In other words, based on the positions and sizes in the image, the positions where the persons 43 and 44 are present can be determined to be the locations shown in FIGS. 5B and 5C.

The person position calculation unit 23 stores the positions of the persons (detected positions), which were calculated in step S12, in the detected position storage unit 24. At this time, the detection times (imaging times) are also stored in the detected position storage unit 24 along with the detected positions. Also, whether the detected persons are standing or sitting is determined based on the height information included in the detected positions, and information indicating the determination results is stored in the detected position storage unit 24 in association with the detection points.

The processing from step S10 to step S13 is executed repeatedly. Accordingly, the detected positions of multiple detection results are accumulated in the detected position storage unit 24. Also, as person detection is executed repeatedly, the person position calculation unit 23 also performs processing for tracking the movement paths of persons. The acquired movement paths are stored in the detected position storage unit 24, and information indicating the movement paths that the respective detection points correspond to is also stored in the detected position storage unit 24. Also, information indicating whether the detected persons are moving or stationary is also determined based on the movement paths and stored. For example, if the speed of movement obtained based on a movement path is greater than or equal to a predetermined threshold value, it can be determined that the corresponding person is moving, and if this speed is less than the threshold value, it can be determined that the corresponding person is stationary.

When the processing from step S10 to step S13 has been repeated for a predetermined duration, the room information inferring unit 25 infers room information based on the information accumulated in the detected position storage unit 24 (step S14). A detailed flow of room information inferring processing is shown in the flowchart of FIG. 6.

In step S601, the room information inferring unit 25 acquires information regarding accumulated person detection points from the detected position storage unit 24, and generates a detection point distribution (presence map). In presence map generation processing, a map plotting the plane positions included in the person detected positions is generated.

Figure 7A:
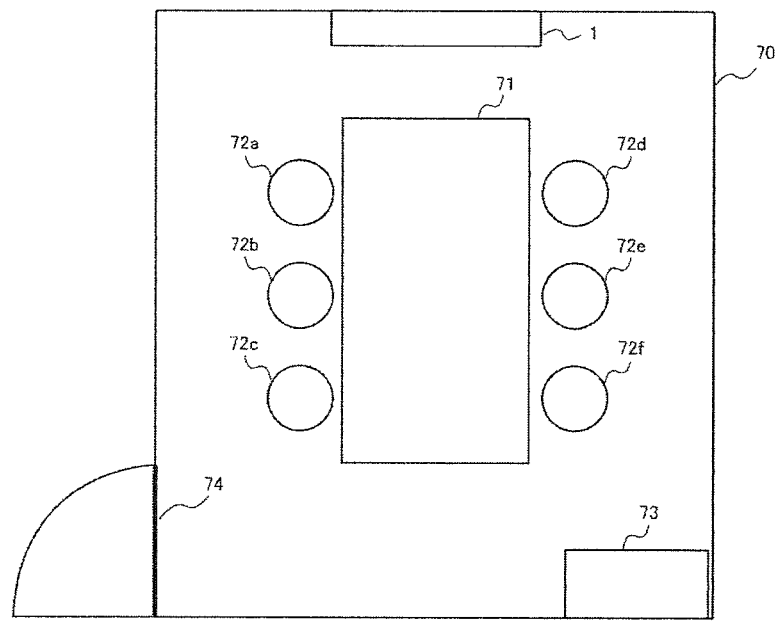
FIGS. 7A and 7B are diagrams showing an example of a person detection result.

The following description takes the example of performing person detection for a certain duration in a room 70 shown in FIG. 7A. A table 71 is placed in the center of the room 70, and chairs 72a to 72f are placed around the table 71. Also, a bookshelf (storage furniture item) 73 is placed in the room 70 in the lower right corner of the figure, and a door (doorway) 74 is placed in the lower left corner of the figure. The air conditioner apparatus 1 of the first embodiment is installed on the wall surface of the room located on the upper side in the figure, and camera imaging and person detection are performed in this state.

Figure 7B:
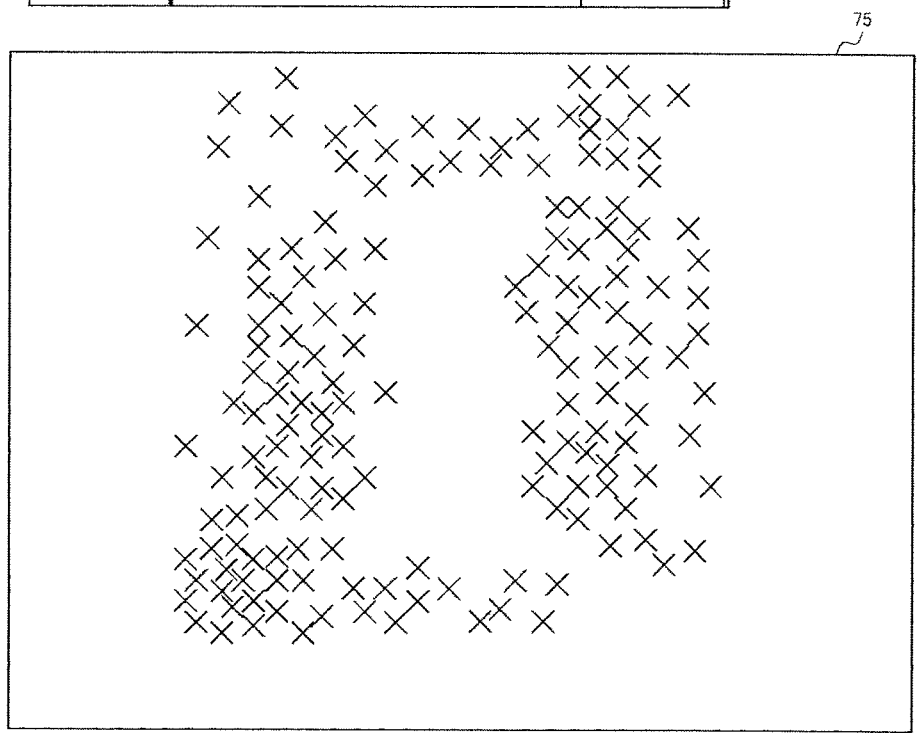

FIG. 7B shows a presence map 75 indicating the distribution of the detection points that were detected in the above example. The positions (horizontal positions) of crosses in FIG. 7B indicate that persons were detected.

First, the room information inferring unit 25 infers the shape of the room. Room shape inferring processing includes the processing of step S602 and step S603. In step S602, the room information inferring unit 25 calculates a polygon that is circumscribed around the distribution of person detection points in the presence map, and infers that the calculated polygon is the shape of the room (the shape of wall surfaces). The polygon may be any polygon, but since rooms generally have a rectangular (elongated rectangular) shape, the room information inferring unit 25 can infer that the shape of the room is a rectangle circumscribed around the distribution of person detection points. Here, it is assumed that the sides of the rectangle are parallel to the direction of the wall surface on which the air conditioner apparatus 1 is installed, and the direction orthogonal to this direction (which are the same as the horizontal imaging direction of the camera 21, and the horizontal direction orthogonal to this direction).

Figure 8:
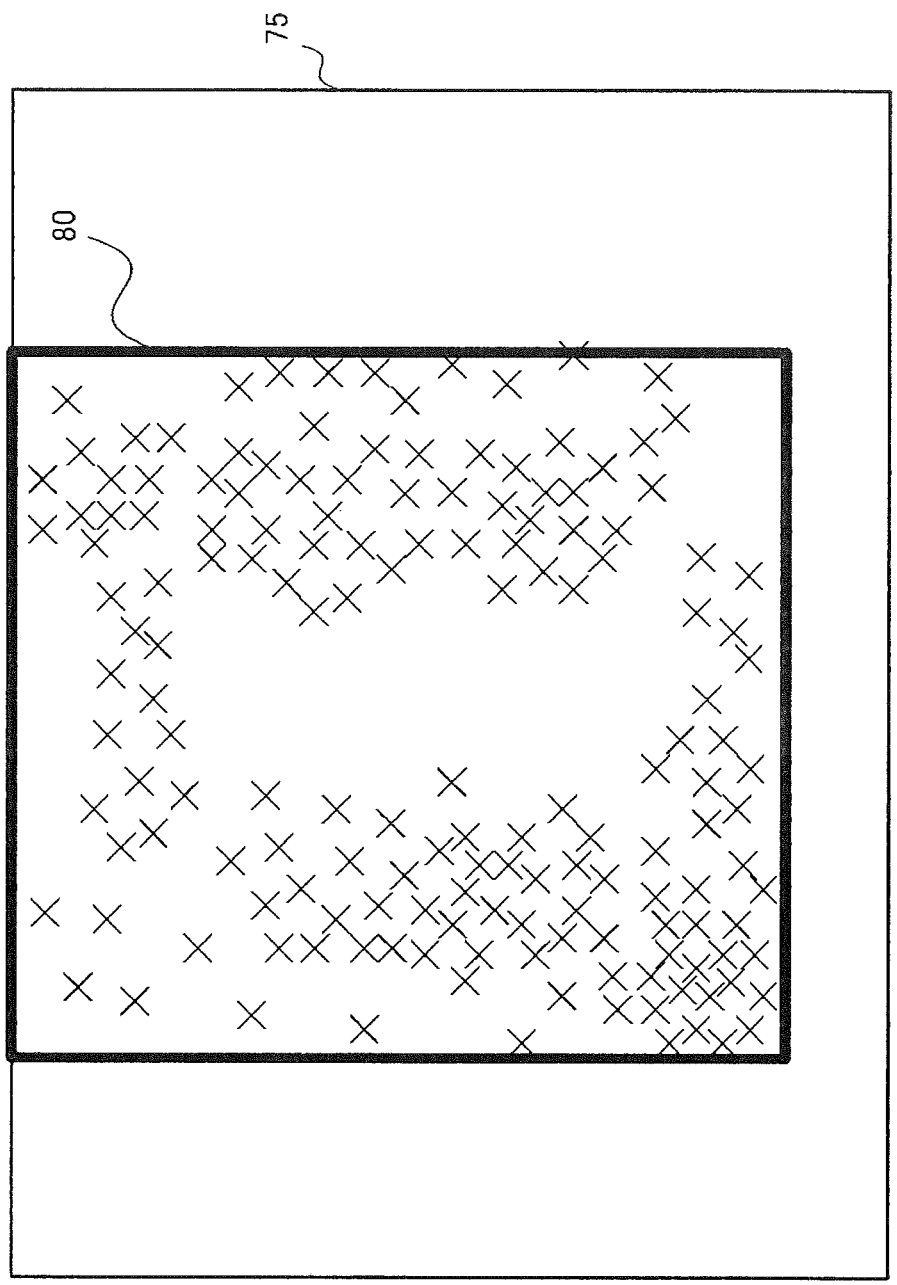
FIG. 8 is a diagram for describing a room shape inferred based on a person detection result.

FIG. 8 shows the room shape obtained based on the presence map 75 shown in FIG. 7B. Here, a room shape 80 is obtained as the smallest circumscribed rectangle around the detection points in the presence map 75.

Note that the room shape inferred based on the presence map need not be limited to a rectangle, and it is sufficient that a circumscribed polygon is inferred as the room shape. Here, in one or more embodiments of the present invention, the polygon circumscribed around the presence map is obtained based on the assumption that the room is defined by straight lines (walls) that are parallel to two directions, namely the direction of the wall surface on which the air conditioner apparatus 1 is installed, and the direction orthogonal to this direction (i.e., the horizontal imaging direction of the camera 21 and the horizontal direction orthogonal to this direction). This is because although a room does not have a rectangular shape if it includes a column or the like, the directions of the respective wall surfaces are generally two directions that are orthogonal to each other.

Figure 9A:
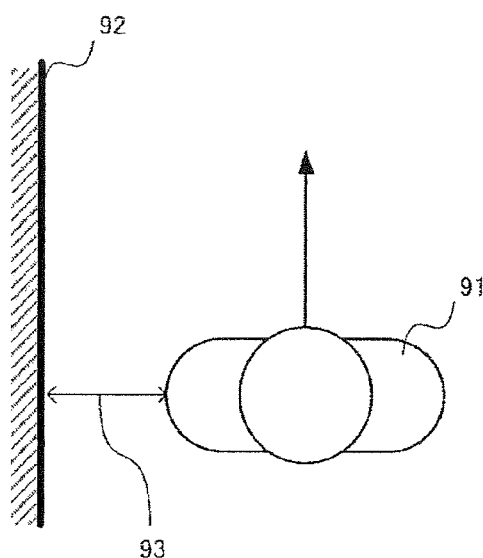
FIGS. 9A to 9D are diagrams for describing processing for correcting a room shape giving consideration to the distance between people and wall surfaces.

Next, the room information inferring unit 25 subjects the room shape inferred in step S602 to correction processing for correcting wall surface positions (the room shape) (step S603). In step S602, a rectangle circumscribed around person detection points is obtained as the room shape. However, it is rare for people to actually be located at positions in contact with a wall. In general, as shown in FIG. 9A, it is though that a person 91 is located at a position separated from a wall surface 92 by a certain distance 93. In particular, in the case where the person 91 is moving, the distance between the person 91 and the wall surface 92 increases. In view of this, the room information inferring unit 25 infers the shape of the room based on the assumption that the wall surfaces in the actual room shape are outward by a predetermined distance from the circumscribed rectangle 80 that was inferred in step S602. However, it is conceivable that the person 91 is stationary and leaning against the wall surface 92, and in this case the distance 93 to the wall surface is lower than in the case of a moving point (the distance 93 may be deemed to be zero). In view of this, it is sufficient that in the case where the detection point is a moving point, the predetermined distance is set higher, whereas in the case where the detection point is a stationary point, the predetermined distance is set lower.

Figure 9B:
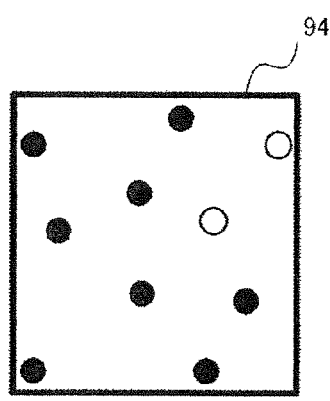
Figure 9C:
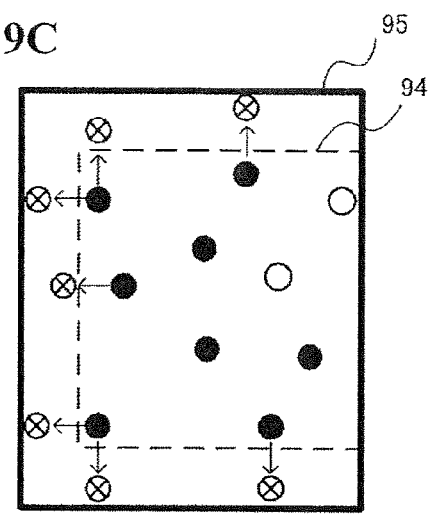

Take the example where a room shape 94 is inferred in step S602 based on the detection point distribution shown in FIG. 9B. Note that in FIG. 9B, black circles represent moving points, and white circles represent stationary points. The room information inferring unit 25 extracts moving points that are located in the vicinity of boundaries of the inferred room shape 94, and it is deemed that detection points exist outward of the actual detection points. As shown in FIG. 9C, in the case of a moving point in the vicinity of a wall surface, it is deemed that a detection point exists at a position separated by a predetermined distance in a direction orthogonal to the nearby wall surface (circle with a cross). In the case of a detection point in the vicinity of a corner of the room, a deemed detection point is set for each of the wall surfaces making up the corner. Also, in the case of a stationary point, this processing is not performed, or it is deemed that a detection point exists at a position separated by a shorter distance than in the case of a moving point (in FIG. 9C, processing for setting a deemed detection point is not performed in the case of stationary points). The room information inferring unit 25 can acquire a room shape 95 shown in FIG. 9C by re-obtaining a rectangle circumscribed around detection points that include the deemed detection points set as described above. The room shape 95 obtained in this way can be said to be a shape that is more accurate to the extent that consideration is given to the distance between wall surfaces and people.

Figure 9D:
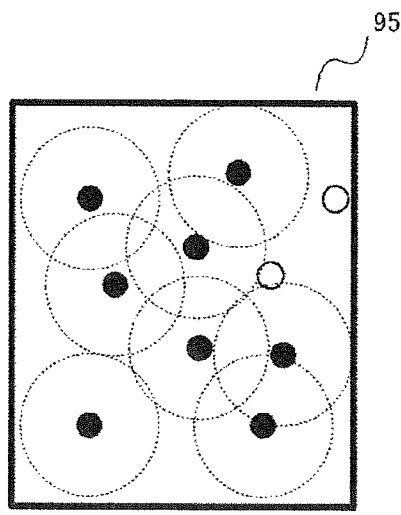

Note that although a rectangle circumscribed around the detection points is obtained two times in the above example, the processing of step S602 and step S603 can be performed in a collective manner. As shown in FIG. 9D, moving points are deemed to have a spread of a predetermined distance. The predetermined spread is indicated by dashed-line circles. Stationary points are deemed to not have a spread, or are deemed to have a spread with a smaller radius than the moving points. By obtaining a rectangle circumscribed around detection points having these spreads, it is possible to obtain the same room shape 95 as above.

Figure 10:
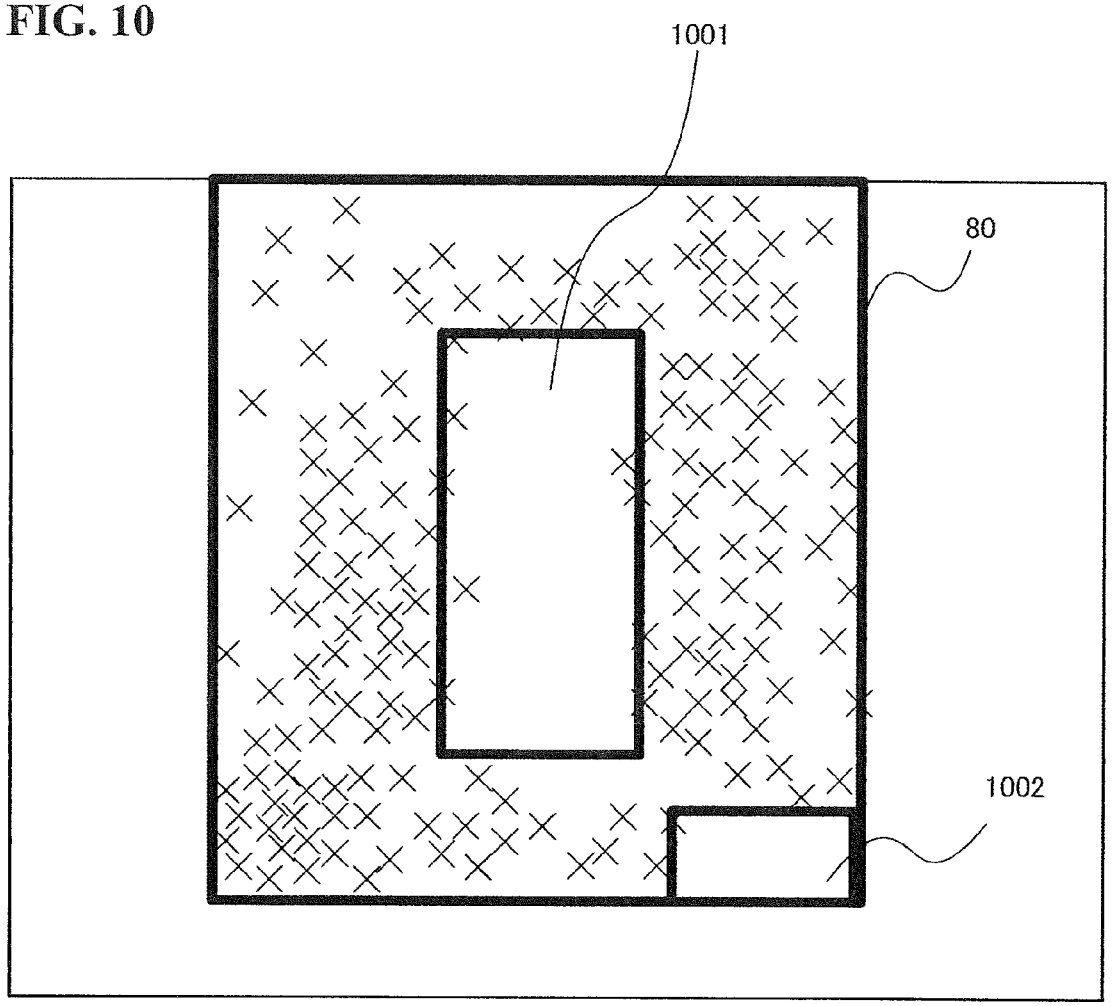
FIG. 10 is a diagram for describing processing for detecting a furniture placement region in a room.

Next, the room information inferring unit 25 detects the placement region of furniture items in the room. Furniture placement region inferring processing includes the processing from step S604 to step S607 described below. Specifically, first, in step S604, the room information inferring unit 25 determines whether the presence map includes a region in which no person detection points are located (called a blank region), and if such a blank region is included, specifies the range of the blank region. In the example in FIG. 8, regions not including any person detection points are located in the center and the lower right portion of the figure, and therefore two blank regions 1001 and 1002 are specified as shown in FIG. 10. A rectangle inscribed by surrounding detection points may be obtained as the position of a blank region, or the position of a blank region may be determined such that several detection points are located inside the blank region. This is because there are cases where a person's head is located above a furniture item. Also, the blank region is not limited to having a rectangular shape, and it may have another polygonal shape, or any other shape such as a circular or elliptical shape.

When blank regions are specified, for each blank region, the room information inferring unit 25 determines whether the blank region is surrounded by person detection points (step S605). A blank region surrounded by person detection points (YES in step S605) is inferred to be a table (step S606), and a blank region not surrounded by person detection points (NO in step S605) is inferred to be a wall region or a furniture item placed next to a wall (step S607). For example, since the blank region 1001 in FIG. 10 is surrounded by person detection points, it can be inferred that a table is placed in that region. On the other hand, since the blank region 1002 is not surrounded by person detection points, it can be inferred that the region is a wall region or a furniture item placed next to the wall.

Furthermore, in step S608, the room information inferring unit 25 infers additional information regarding the room shape based on the person movement paths obtained by person tracking processing. Examples of the additional information include the locations of doorways, the locations of storage furniture items and the like, and the locations of aisles.

Figure 11:
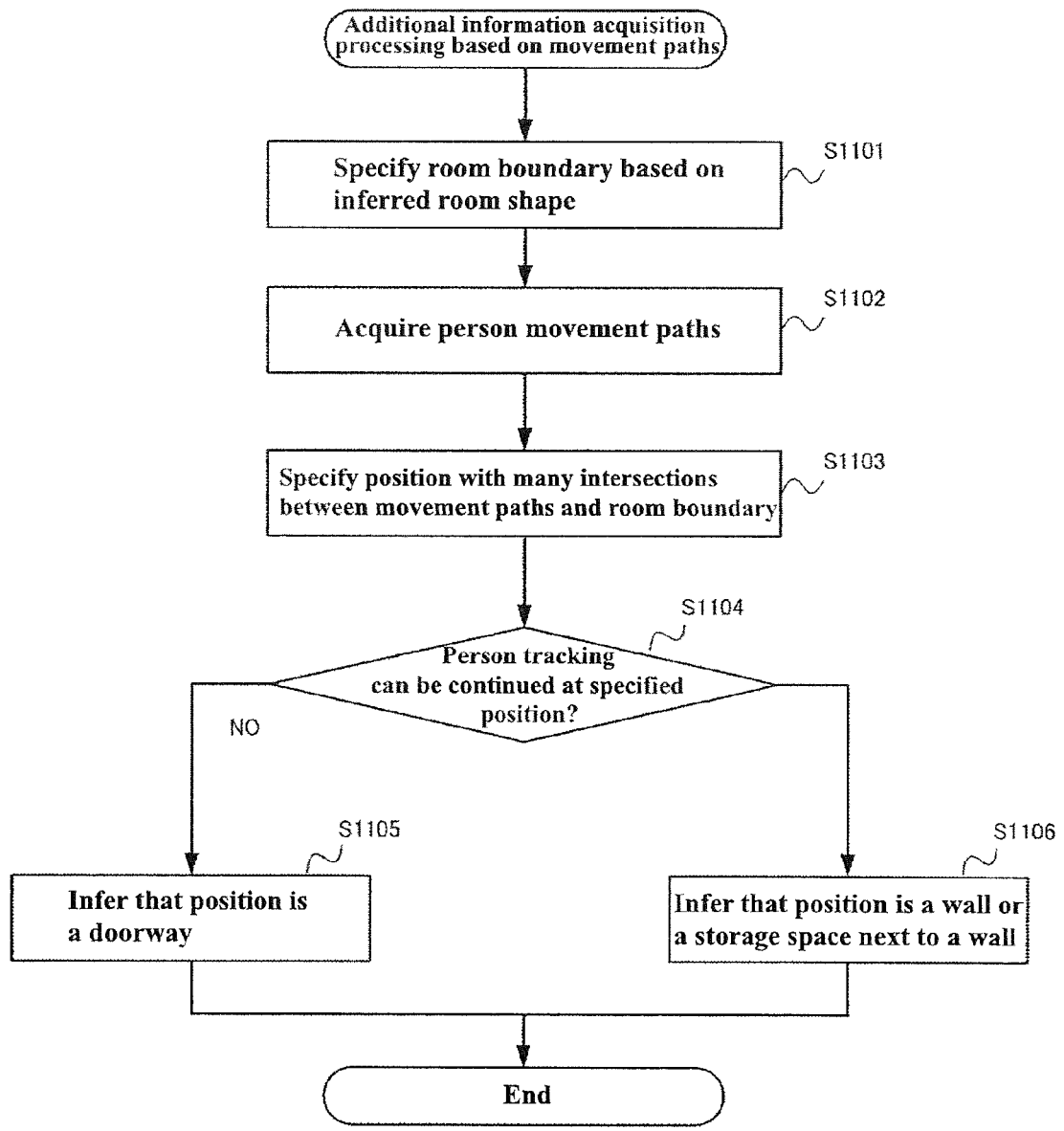
FIG. 11 is a flowchart showing a flow of processing for inferring a doorway and a storage space based on movement paths.
Figure 12A:
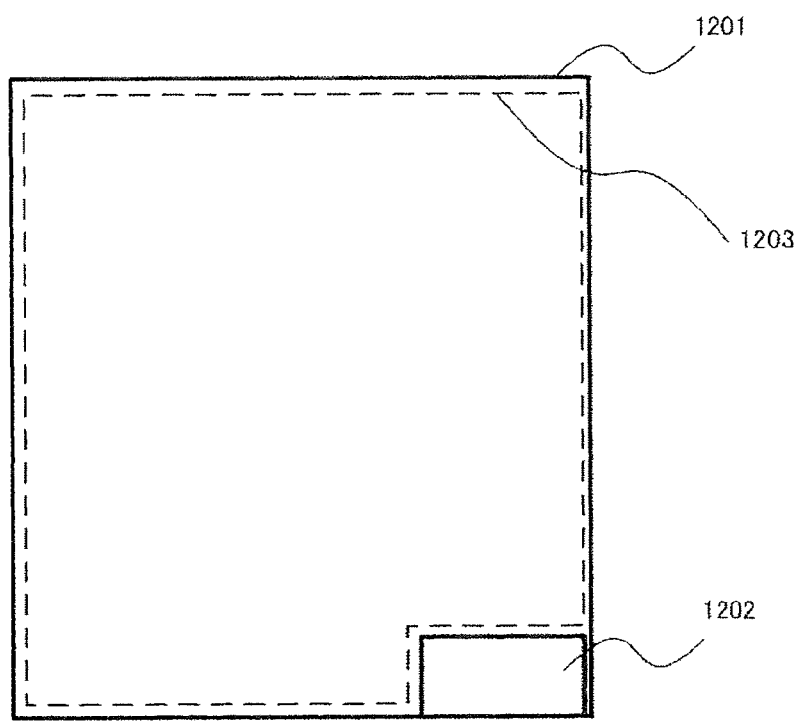
FIGS. 12A and 12B are diagrams for describing processing for inferring a doorway and a storage space based on peoples' movement paths.

A technique for inferring the locations of doorways and storage furniture items will be described below with reference to FIGS. 11 and 12. The room information inferring unit 25 acquires the room shape information that was inferred through the processing up to step S607, and specifies the boundary of the room (step S1101). The boundary of the room shape refers to the substantial boundary of the habitable space in the room, and therefore refers to the boundary of the region that does not include furniture items placed next to the walls. It is assumed that a room shape 1201 shown in FIG. 12A has been inferred through the processing up to step S607. Also, a region 1202 is inferred to be a blank region not surround by person detection points, that is to say a wall region or a furniture item placed next to a wall. In this case, a boundary 1203 of a region excluding the region 1202 from the room shape 1201 is specified as the boundary of the room shape. Note that the boundary of the room shape may be determined as the perimeter in the presence map.

Figure 12B:
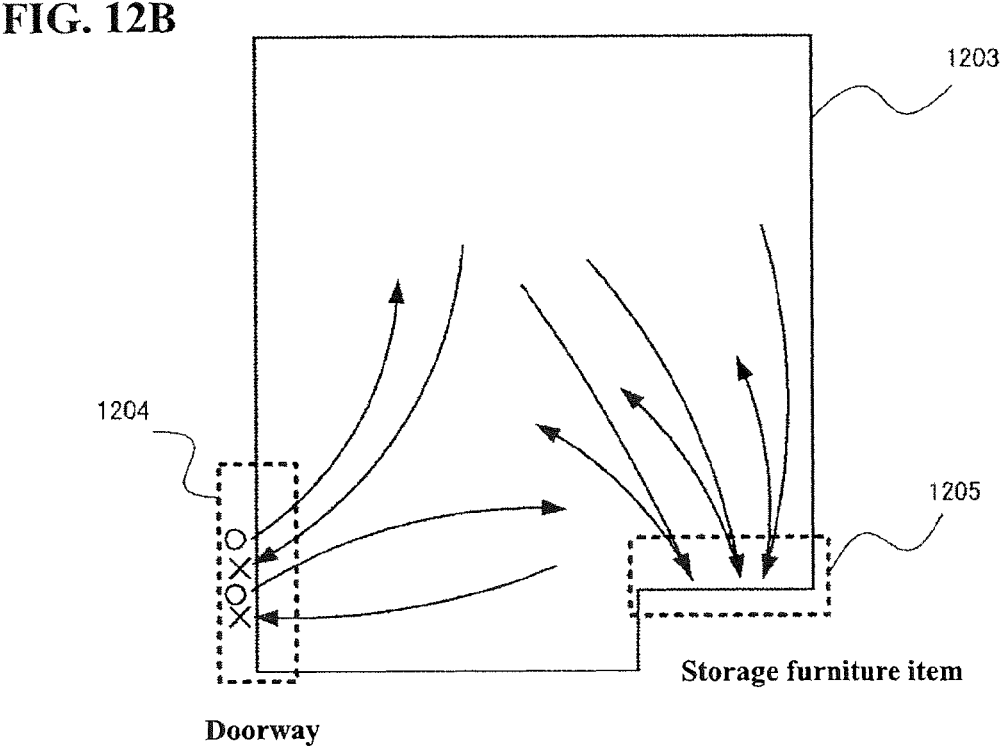

Next, the room information inferring unit 25 acquires the person movement paths (the results of person tracking processing) stored in the detected position storage unit 24 (step S1102). FIG. 12B is a diagram showing an example of movement paths, and the movement paths are indicated by lines with arrow heads. Note that crosses indicate locations where person tracking could no longer be performed, and circles indicate locations where person tracking started (where a person was newly detected).

The room information inferring unit 25 specifies a location where the number of intersections between movement paths and the boundary 1203 is greater than or equal to a predetermined number (step S1103). In the example in FIG. 11B, the two regions 1204 and 1205 can be specified. The predetermined number referred to here may be a certain prescribed number, or may be a number determined according to the number of movement paths stored in the detected position storage unit 24, for example.

The room information inferring unit 25 determines whether or not person tracking could be continued at the location specified in step S1103 (step S1104). A location where person tracking could not be continued (NO in step S1104) is inferred to be a location where a doorway is placed (step S1105), and a location where person tracking could be continued (YES in step S1104) is inferred to be a storage space (step S1106). If a person enters a doorway, that person is newly detected, and if a person exits the doorway, it is no longer possible to perform person tracking at that time. On the other hand, even if a person approaches a storage space such as a closet or a cabinet, they do not exit the room, and therefore person tracking can be continued. Accordingly, it is possible to make the above-described determination.

Note that the example of inferring the placement locations of a doorway and a storage space is described as an example of the additional information inferring of step S1308. However, other information may be acquired as additional information. For example, a location where people move and do not remain stationary (movement region) can be determined to be an aisle. Also, a location where people often remain stationary (stationary region) can be determined to be a table, a sofa, a bed, a kitchen, or the like. Furthermore, it is possible to determine which of the above the location corresponds to based on the detected height of the stationary people. It is also possible to determine whether the location corresponds to a table or a sofa based on the line of sight directions or face directions at the stationary points. In the case of a table, people often sit facing each other, whereas in the case of a sofa, people rarely sit facing each other, and this makes it possible to distinguish between the two. In this way, not only the shape of the room, but also various types of additional information can be acquired based on person detection results.

The room information inferring unit 25 outputs information such as the shape of the room, furniture placement locations, and doorway locations, which were obtained as described above, and stores this information in the room information storage unit 3. Room information inferring processing performed in step S14 of FIG. 3 has been described above.

In step S15, the air conditioning control unit 4 carries out air conditioning control based on the inferred room information. For example, the blowing amount and the blowing direction of the blowing fan 7 are appropriately controlled based on the shape of the room. Specifically, in the case where the distance to the opposing wall is long, the blowing amount is increased, and the blowing direction is adjusted so as to circulate the air and prevent the formation of hot spots in the room. It is also possible to perform control such that the air stream does not directly hit a location where a person is stationary, and perform control for conversely causing an air stream to directly hit a location where a person is stationary. If the type of location where the person is stationary is known (e.g., a table, a sofa, a bed, or a kitchen), control can be performed in accordance with the type of location. For example, it is conceivable to perform control for preventing an air stream from directly hitting a table, a sofa, and a bed, but causing an air stream to directly hit a kitchen. Also, in one or more embodiments of the present invention, if the location of a doorway or an aisle is known, air conditioning control is carried out giving consideration to this information as well. Note that the air conditioning control unit 4 can perform air conditioning control giving consideration to not only room information that has been inferred in advance, but also information such as the number and locations of people acquired in real-time by the person position calculation unit 23.

According to the air conditioner apparatus of the first embodiment described above, even if a user does not input information regarding a room, room information can be automatically inferred by the room information inferring apparatus. Since a technique for detecting a person based on a face, a head, or an upper body is used in this room information processing, an image captured by a normal monocular camera is sufficient, thus eliminating the need for an expensive camera such as a stereo camera or a TOF camera, and making it possible to suppress the apparatus manufacturing cost. Furthermore, the three-dimensional position (particularly the height) of a person is detected, and whether the person is moving or stationary is also detected based on their movement path. Taking these pieces of information into consideration makes it possible to determine the categories of locations in the room. Since the shape of the room and the categories of locations therein are known, the air conditioner apparatus can carry out appropriate air conditioning control in accordance with the room in which it is installed.

Variation of First Embodiment

Although the shape of the room is inferred in the first embodiment, it is not necessarily required to infer the shape of the room as room-related information. For example, a people containing region may be inferred based on a presence map plotting person detection points. Even if the shape of the room is not known, if a people containing region is known, appropriate air conditioning control can be carried out in accordance with such information.

A people containing region can be inferred as described below, for example. The room information inferring unit 25 specifies a region in the presence map that includes a predetermined percentage or more of person detection points (this region can also be said to be a region in which the density of person detection points is high), and infers that the specified region is a people containing region. In other words, a location with a high probability of people being present is inferred to be a people containing region.

Note that if the person detection unit performs person tracking processing, and it is known whether the respective detection points are moving points or stationary points, the people containing region can be divided into smaller regions. Specifically, within the people containing region, a region containing many stationary points is inferred to be a stationary region. A stationary region is a location where people remain for a relatively long time, such as a table or sofa, for example. Conversely, within the people containing region, a region containing many moving points is inferred to be a movement region. A movement region is a region used by people solely for movement, such as an aisle. Note that whether or not a region includes many stationary points or moving points can be determined based on whether or not a predetermined percentage or more of all of the detection points in the region are stationary points or moving points.

The use of a people containing region makes it possible to perform air conditioning control in which, for example, a people containing region (particularly a stationary region) is cooled with priority in accordance with the user needs. Also, air conditioning control can be performed such that an air stream does not directly hit a people containing region (particularly a stationary region). In this way, even if the room shape is not known, if the people containing region is known, air conditioning control that achieves comfort and energy reduction can be performed.

Second Embodiment

An air conditioner apparatus of the second embodiment has the configuration of the first embodiment, and additionally infers a life scene lifecycle based on person detection results, and carries out appropriate air conditioning control giving consideration to life scenes in addition to the room shape.

A life scene is a typical behavior pattern that arises in a living space. Examples of life scenes include behavior patterns such as cooking, eating, spending family time together, and studying. A life scene lifecycle is a cycle indicating the time periods in which respective life scenes appear. The appropriate air conditioning control method differs according to the life scene, and therefore if the life scene lifecycle is known, favorable air conditioning control can be realized using the life scene lifecycle.

Figure 13:
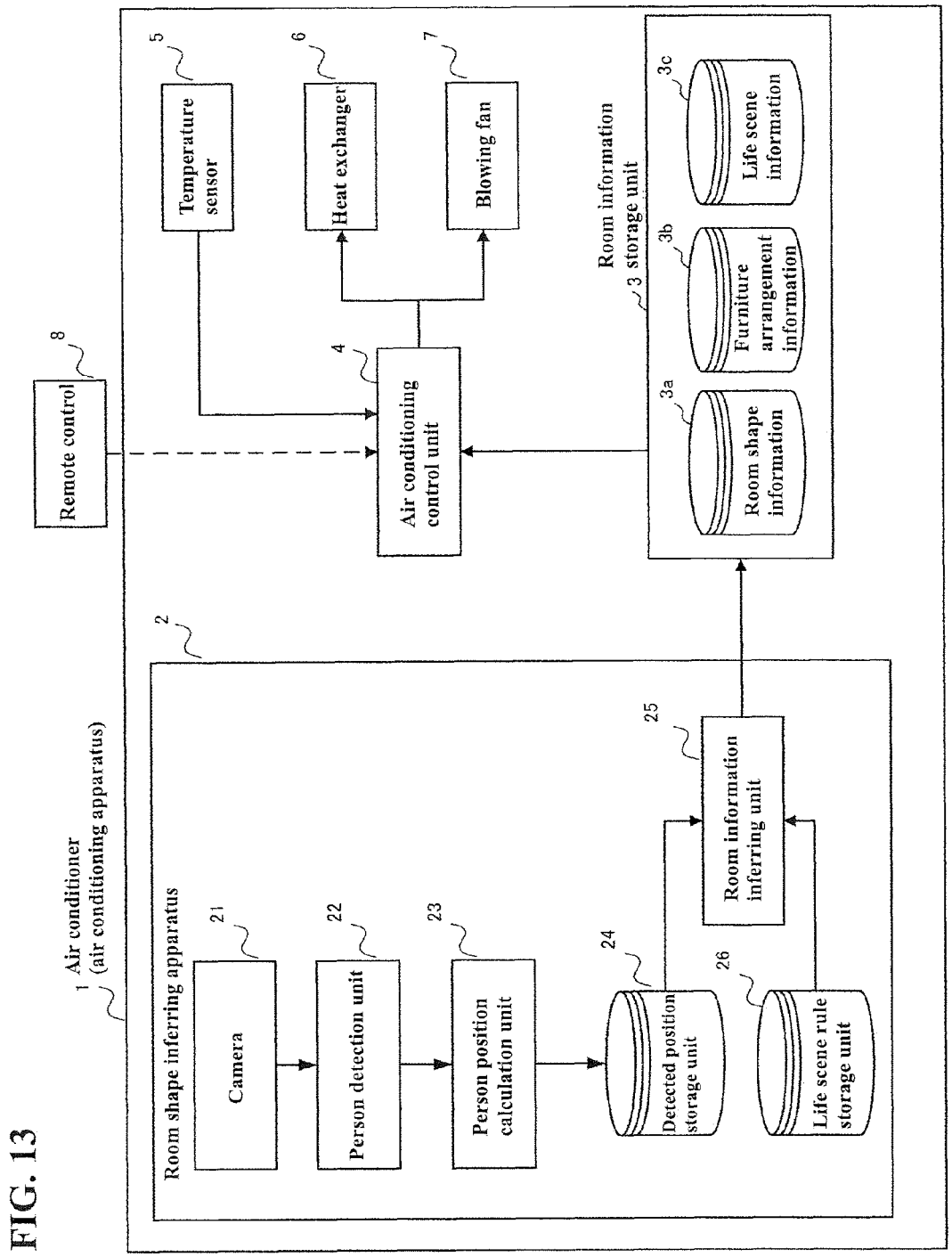
FIG. 13 is a functional block diagram of an air conditioner apparatus that includes a room information inferring apparatus according to a second embodiment.

FIG. 13 is a functional block diagram of the air conditioner apparatus 1 according to the second embodiment. A comparison with the first embodiment shows differences in that the room information inferring apparatus 2 includes a life scene rule storage unit 26, and the room information inferring unit 25 infers life scene information as well. Also, the room information storage unit 3 stores life scene information 3c as well, and air conditioning control is performed giving consideration to the life scene information 3c as well.

The life scene rule storage unit 26 stores rules defining life scenes. A life scene includes information indicating the time period in which the life scene appears, and the behavior pattern that occurs therein. The following example shows life scene rules for two life scenes, namely "cooking" and "dinner time".

Life scene name: Cooking
Time period: evening to night
Behavior pattern: movement while standing for a long duration (e.g., 30 minutes or more) in a specific region (kitchen)
Life scene name: Dinner time
Time period: evening to night
Behavior pattern: stationary while sitting at a specific location (dining table). In particular, multiple people are stationary and sitting facing each other.

The above rules are relatively simple rules, and more detailed rules may be described. Also, besides the life scenes given as examples above, rules regarding more life scenes are stored in the life scene rule storage unit 26.

The room information inferring unit 25 determines the behavior pattern that corresponds to the life scene rules based on the person detection results stored in the detected position storage unit 24 in addition to the room information described in the first embodiment. Note that since information indicating the times when detection points were detected is needed in the second embodiment, the detected position storage unit 24 needs to store the positions of person detection points along with time information indicating when the detection points were detected.

Figure 14:
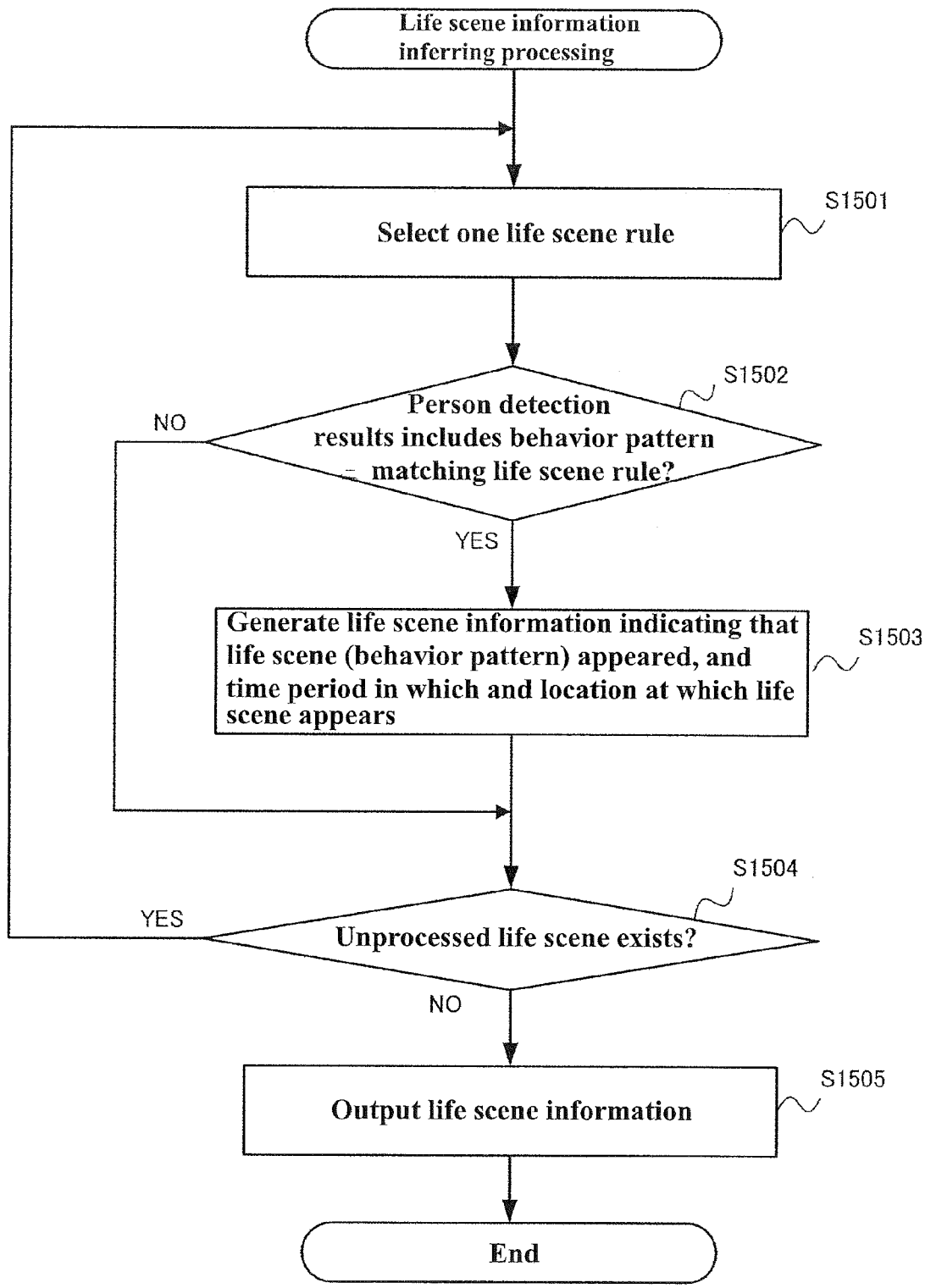
FIG. 14 is a flowchart showing a flow of life scene information inferring processing according to the second embodiment.

Air conditioning control processing and room information inferring processing of the second embodiment is basically the same as in the first embodiment (FIGS. 3 and 6). Note that the second embodiment is different in that life scene information inferring processing is added in room information inferring processing. FIG. 14 is a flowchart showing the flow of life scene information inferring processing. This life scene inferring processing is performed after the processing of step S608 in room information inferring processing, for example.

First, the room information inferring unit 25 selects one life scene and acquires the rule thereof from the life scene rule storage unit 26 (step S1501). Next, the room information inferring unit 25 references the detected position storage unit 24 and determines whether or not a current behavior pattern matches the selected rules (step S1502). For example, in the case of the "cooking" life scene, it is determined whether or not a current behavior pattern is the behavior pattern of moving while standing for a long duration in a specific region in the evening time period. Also, in the case of the "dinner time" life scene, it is determined whether or not a current behavior pattern is a stationary pattern of being stationary while sitting in the time period from evening to night.

If the person detection results include a behavior pattern that matches the life scene rule (YES in step S1502), the room information inferring unit 25 generates life scene information indicating that the life scene (behavior pattern) appeared, and the time period in which and location at which the life scene actually appears (step S1503). For example, the obtained information indicates that the "cooking" life scene appears from 6 o'clock PM to 7 o'clock PM, and the location of the region (kitchen) where that behavior pattern appears. Alternatively, the obtained information indicates that the "dinner time" life scene appears from 7 o'clock PM to 8 o'clock PM, and the location of the region (dining table) where that behavior pattern appears.

Processing for one life scene is completed through the processing described above. The room information inferring unit 25 then determines whether an unprocessed life scene exists (step S1504), and if an unprocessed life scene exists (YES in step S1504), the procedure returns to step S1501, and processing is performed for the next life scene. On the other hand, if processing has been completed for all life scenes (NO in step S1504), the generated life scene information is output (step S1505). The life scene information is stored in the room information storage unit 3 as part of the room information.

Lastly, air conditioning control that employs life scene information will be described briefly. If the above life scene information is known, the air conditioning control unit 4 can realize even more favorable air conditioning control. For example, in the "cooking" life scene, it is hot in the kitchen during cooking, and therefore it is possible to perform control for causing a relatively strong air stream to directly hit a person. In this case, the life scene information includes information indicating the time period in which the "cooking" life scene appears, and the location of the kitchen, thus making it possible to realize control for directing an air stream toward the location of the kitchen in that time period. Similarly, in the "dinner time" life scene, it is not comfortable to be directly hit with an air stream, and therefore it is possible to realize control for directing an air stream toward the periphery of the table.

According to the second embodiment, it is possible to acquire information regarding life scenes that appear at the location where the air conditioner apparatus is installed based on person detection results, and it is possible to realize appropriate air conditioning control that gives consideration to life scenes. The user does not need to directly input information regarding life scenes here, and this is very user-convenient.

Other Embodiments

The description of the above embodiments merely describes embodiments of the present invention by way of illustrative examples, and the present invention is not intended to be limited to the above specific embodiments. The present invention can be modified in various ways within the scope of the technical idea of the invention.

In the first and second embodiments, the room information inferring apparatus infers various types of information as room information, and the air conditioner apparatus performs air conditioning control based on the inferred information. Various modifications are possible with respect to the room information that is inferred and used in air conditioning control. For example, although room information such as the room shape, the furniture arrangement, doorways, storage furniture items, and stationary regions and movement regions of people (people containing regions) is acquired in the first embodiment, as long as information includes at least some of the above, that information can be made use of in air conditioning control. Accordingly, the room information inferring apparatus may infer at least a portion of these types of information. Also, although air conditioning control is performed using a combination of information including life scene information and room shape information in the second embodiment, it is possible to similarly use any room information other than life scene information. For example, air conditioning control can be performed based on simply life scene information and furniture arrangement information, and air conditioning control can be performed based on simply life scene information and people containing regions.

In the above descriptions, the room information inferring apparatus 2 is built into the air conditioner apparatus 1. However, the room information inferring apparatus 2 may be constituted as an apparatus separate from the air conditioner apparatus 1. As long as room information and life scene information inferred by the room information inferring apparatus 2 is transmitted to the air conditioner apparatus by wireless communication or the like, the air conditioner apparatus can realize air conditioning control based on such information.

Also, although an air conditioner apparatus (cooling and heating device) is described as an example of the air conditioning apparatus, the room information inferring apparatus may be incorporated in an apparatus such as an air purifier, a humidifier, or a blower. Also, the room information inferring apparatus can be incorporated in and used in any apparatus other than an air conditioning apparatus, as long as it is an apparatus in which optimal control is determined according to room information. For example, it is conceivable for the room information inferring apparatus to be incorporated in and used in a lighting control apparatus or the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A room information inferring apparatus that infers information regarding a room, comprising:
   an imaging unit that captures an image of a room that is to be subjected to inferring;
   a person detector that detects a person in an image captured by the imaging unit, and acquires a position of the person in the room;
   a presence map generator that generates a presence map indicating a distribution of detection points corresponding to persons detected in a plurality of images captured at different times; and
   an inferring unit that infers information regarding the room based on the presence map,
   wherein, in a case where the presence map includes a blank region that includes no detection points and is surrounded by detection points, the inferring unit infers that the blank region is a region in which a furniture item is placed.

2. The room information inferring apparatus according to claim 1, wherein the person detector detects a face, a head, or an upper body of the person in the image, and acquires the position of the person in the room based on a position and a size of the face, the head, or the upper body in the image.

3. The room information inferring apparatus according to claim 1, wherein the inferring unit infers a shape of the room based on the presence map.

4. The room information inferring apparatus according to claim 3, wherein the inferring unit infers that a polygon circumscribed around the distribution of detection points in the presence map is the shape of the room.

5. The room information inferring apparatus according to claim 4, wherein the inferring unit infers the shape of the room based on an assumption that the room is defined by straight lines that are parallel in two mutually orthogonal directions.

6. The room information inferring apparatus according to claim 5, wherein the two directions are respectively an imaging direction of the imaging unit and a direction orthogonal to the imaging direction.

7. The room information inferring apparatus according to claim 4, wherein, when inferring the shape of the room, the inferring unit deems that a wall surface is outward by a predetermined distance from a shape obtained as a polygon circumscribed around the distribution of detection points in the presence map.

8. The room information inferring apparatus according to claim 7,
   wherein the person detector also detects whether a person at a detected position is moving or stationary, and
   wherein, in a case of a detection point at which the person is stationary, the inferring unit sets the predetermined distance lower than in a case of a detection point at which the person is moving.

9. The room information inferring apparatus according to claim 1,
   wherein the person detector also detects whether a person at a detected position is moving or stationary, and
   wherein, in a case where a group of stationary points exists in a periphery of the blank region, the inferring unit infers that a table is placed in the blank region.

10. The room information inferring apparatus according to claim 1, wherein in a case where the presence map includes a blank region that includes no detection points and is not surrounded by detection points, the inferring unit infers that the blank region is a wall region or a region in which a furniture item is placed next to a wall.

11. The room information inferring apparatus according to claim 1, wherein the inferring unit infers a people containing region based on the presence map.

12. The room information inferring apparatus according to claim 11,
    wherein the person detector also detects whether a person at a detected position is moving or stationary, and
    wherein the inferring unit infers that, in the people containing region, a region including more than a predetermined percentage of stationary detection points is a stationary region.

13. The room information inferring apparatus according to claim 11,
    wherein the person detector unit also detects whether a person at a detected position is moving or stationary, and
    wherein the inferring unit infers that, in the people containing region, a region including more than a predetermined percentage of moving detection points is a movement region.

14. The room information inferring apparatus according to claim 1,
    wherein the person detector also performs processing for tracking a detected person, and wherein, in a case of a location at which the number of intersections between person movement paths and a boundary of the inferred room shape is greater than or equal to a predetermined number, the inferring unit infers that the location is a doorway of the room or a storage space.

15. The room information inferring apparatus according to claim 14, wherein, in a case of a location at which the number of intersections between person movement paths and the boundary of the inferred room shape is greater than or equal to a predetermined number, and at which person tracking can no longer be performed, or a person is newly detected, the inferring unit infers that the location is a doorway of the room.

16. The room information inferring apparatus according to claim 14, wherein, in a case of a location at which the number of intersections between person movement paths and a boundary of the inferred room shape is greater than or equal to a predetermined number, and at which person tracking can be continued, the inferring unit infers that the location is a storage space.

17. The room information inferring apparatus according to claim 1,
wherein the person detector also acquires time information indicating when the person was detected,
wherein the room information inferring apparatus further comprises a storage unit that stores a life scene definition that includes a time period and a behavior pattern, and
wherein the inferring unit infers a life scene that appears in the room based on a behavior pattern of a person obtained based on a detection result from the person detector, time information indicating when the person was detected, and the life scene definition stored in the storage unit.

18. A room information inferring method carried out by a room information inferring apparatus, comprising:
an imaging step of capturing an image of a room that is to be subjected to inferring;
a person detection step of detecting a person in an image captured in the imaging step, and acquiring a position of the person in the room;
a presence map generation step of generating a presence map indicating a distribution of detection points corresponding to persons detected in a plurality of images captured at different times; and
an inferring step of inferring information regarding the room based on the presence map,
wherein, in a case where the presence map includes a blank region that includes no detection points and is surrounded by detection points, the inferring apparatus infers that the blank region is a region in which a furniture item is placed.

19. A program stored on a non-transitory computer readable medium that causes a computer to execute a room information inferring method comprising:
an imaging step of capturing an image of a room that is to be subjected to inferring;
a person detection step of detecting a person in an image captured in the imaging step, and acquiring a position of the person in the room;
a presence map generation step of generating a presence map indicating a distribution of detection points corresponding to persons detected in a plurality of images captured at different times; and
an inferring step of inferring information regarding the room based on the presence map,
wherein, in a case where the presence map includes a blank region that includes no detection points and is surrounded by detection points, the inferring method infers that the blank region is a region in which a furniture item is placed.

20. An air conditioning apparatus comprising:
the room information inferring apparatus according to claim 1; and
a controller that performs air conditioning control based on information regarding a room that is inferred by the room information inferring apparatus.

* * * * *